United States Patent
Martin et al.

(10) Patent No.: US 9,718,533 B2
(45) Date of Patent: Aug. 1, 2017

(54) FUEL TANK ACCESS DOOR SYSTEMS AND METHODS

(71) Applicant: Textron Innovations Inc., Providence, RI (US)

(72) Inventors: Billy M. Martin, Derby, KS (US); Timothy E. Harrison, Wichita, KS (US); Zai Lo, Wichita, KS (US); Brandon L. Parks, Andale, KS (US)

(73) Assignee: Textron Innovations, Inc., Providence, RI (US)

( * ) Notice: Subject to any disclaimer, the term of this patent is extended or adjusted under 35 U.S.C. 154(b) by 159 days.

(21) Appl. No.: 14/789,330

(22) Filed: Jul. 1, 2015

(65) Prior Publication Data

US 2016/0001871 A1  Jan. 7, 2016

Related U.S. Application Data

(60) Provisional application No. 62/019,746, filed on Jul. 1, 2014.

(51) Int. Cl.
| | |
|---|---|
| *B64C 3/34* | (2006.01) |
| *B64C 1/14* | (2006.01) |
| *B64D 37/32* | (2006.01) |
| *B64D 45/02* | (2006.01) |

(52) U.S. Cl.
CPC .............. *B64C 3/34* (2013.01); *B64C 1/1446* (2013.01); *B64D 37/32* (2013.01); *B64D 45/02* (2013.01); *Y02T 50/44* (2013.01)

(58) Field of Classification Search
CPC ........ B64D 37/00; B64D 37/14; B64D 37/16; B64D 37/20; B64D 37/30; B64D 37/32; B64D 39/06; B64D 45/02
See application file for complete search history.

(56) References Cited

U.S. PATENT DOCUMENTS

| | | | |
|---|---|---|---|
| 2,635,785 A * | 4/1953 | Gross | B64D 37/005 220/328 |
| 3,906,308 A * | 9/1975 | Amason | B64D 45/02 244/1 A |
| 4,291,816 A | 9/1981 | Lamoureux | |
| 4,352,142 A | 9/1982 | Olson | |
| 4,502,092 A * | 2/1985 | Bannink, Jr. | B64D 45/02 244/1 A |
| 4,530,443 A * | 7/1985 | Gorges | B64C 3/34 220/327 |
| 4,630,168 A | 12/1986 | Hunt | |

(Continued)

FOREIGN PATENT DOCUMENTS

ES  EP 2441678 A2 * 4/2012 ............. B64D 37/32

*Primary Examiner* — Benjamin P Lee
(74) *Attorney, Agent, or Firm* — Erise IP, P.A.

(57) ABSTRACT

Aircraft fuel tank access door systems and methods incorporating one or more of an outer fuel tank access door completely encapsulated by a dielectric material and an inner fuel tank access door comprising at least one drainage feature are disclosed. These systems and methods reduce or prevent (i) fuel pooling on the inner fuel tank access door, (ii) moisture pooling between the inner and outer fuel tank access doors, and (iii) p-static build up and lightning attachment to the outer fuel tank access door to increase safety, reduce the likelihood of corrosion and ease installation of the fuel tank access door system.

20 Claims, 9 Drawing Sheets

(56) References Cited

U.S. PATENT DOCUMENTS

| | | | | |
|---|---|---|---|---|
| 5,160,064 A * | 11/1992 | LeBlanc | B65D 90/105 | 137/371 |
| 7,050,286 B2 | 5/2006 | Pridham et al. | | |
| 7,277,266 B1 * | 10/2007 | Le | B64D 45/02 | 361/218 |
| 7,576,966 B2 * | 8/2009 | Heeter | B64D 37/005 | 361/215 |
| 7,835,130 B2 * | 11/2010 | Ware | B32B 33/00 | 361/218 |
| 8,443,575 B1 * | 5/2013 | Tanner | E04C 2/54 | 244/129.3 |
| 8,662,451 B2 * | 3/2014 | Delgado Jareno | B64C 1/1446 | 244/129.4 |
| 8,684,216 B2 * | 4/2014 | Tachibana | B64C 3/34 | 220/327 |
| 8,752,792 B2 * | 6/2014 | Motohashi | B64C 3/34 | 244/129.4 |
| 8,840,068 B2 * | 9/2014 | Motohashi | B64C 3/34 | 244/129.4 |
| 9,016,631 B2 * | 4/2015 | Parsley | E06B 5/00 | 244/129.5 |
| 9,079,656 B2 * | 7/2015 | Korenaga | B64C 1/1446 | |
| 9,315,276 B2 * | 4/2016 | Alazraki | B64D 37/32 | |
| 2005/0081949 A1 * | 4/2005 | Kuntz | B64F 1/28 | 141/65 |
| 2007/0207421 A1 * | 9/2007 | Heeter | B64D 37/005 | 431/22 |
| 2007/0230085 A1 * | 10/2007 | Le | B64D 45/02 | 361/212 |
| 2008/0137259 A1 * | 6/2008 | Heeter | B64D 37/32 | 361/218 |
| 2009/0092844 A1 * | 4/2009 | Ware | B32B 33/00 | 428/457 |
| 2009/0166473 A1 * | 7/2009 | Zuniga Sagredo | B64C 1/1446 | 244/129.4 |
| 2009/0294591 A1 * | 12/2009 | Ramirez Blanco | B64C 1/1446 | 244/129.4 |
| 2012/0091269 A1 * | 4/2012 | Lopez-Reina Torrijos | B64D 45/02 | 244/1 A |
| 2012/0187247 A1 * | 7/2012 | Delgado Jareno | B64C 1/1446 | 244/129.5 |
| 2013/0015294 A1 * | 1/2013 | Motohashi | B64C 3/34 | 244/129.4 |
| 2013/0180176 A1 * | 7/2013 | Tachibana | B64C 1/1446 | 49/40 |
| 2015/0210375 A1 * | 7/2015 | Harrison | B64C 1/1492 | 244/1 A |
| 2015/0353340 A1 * | 12/2015 | Gammon | B64D 37/00 | 141/1 |

* cited by examiner

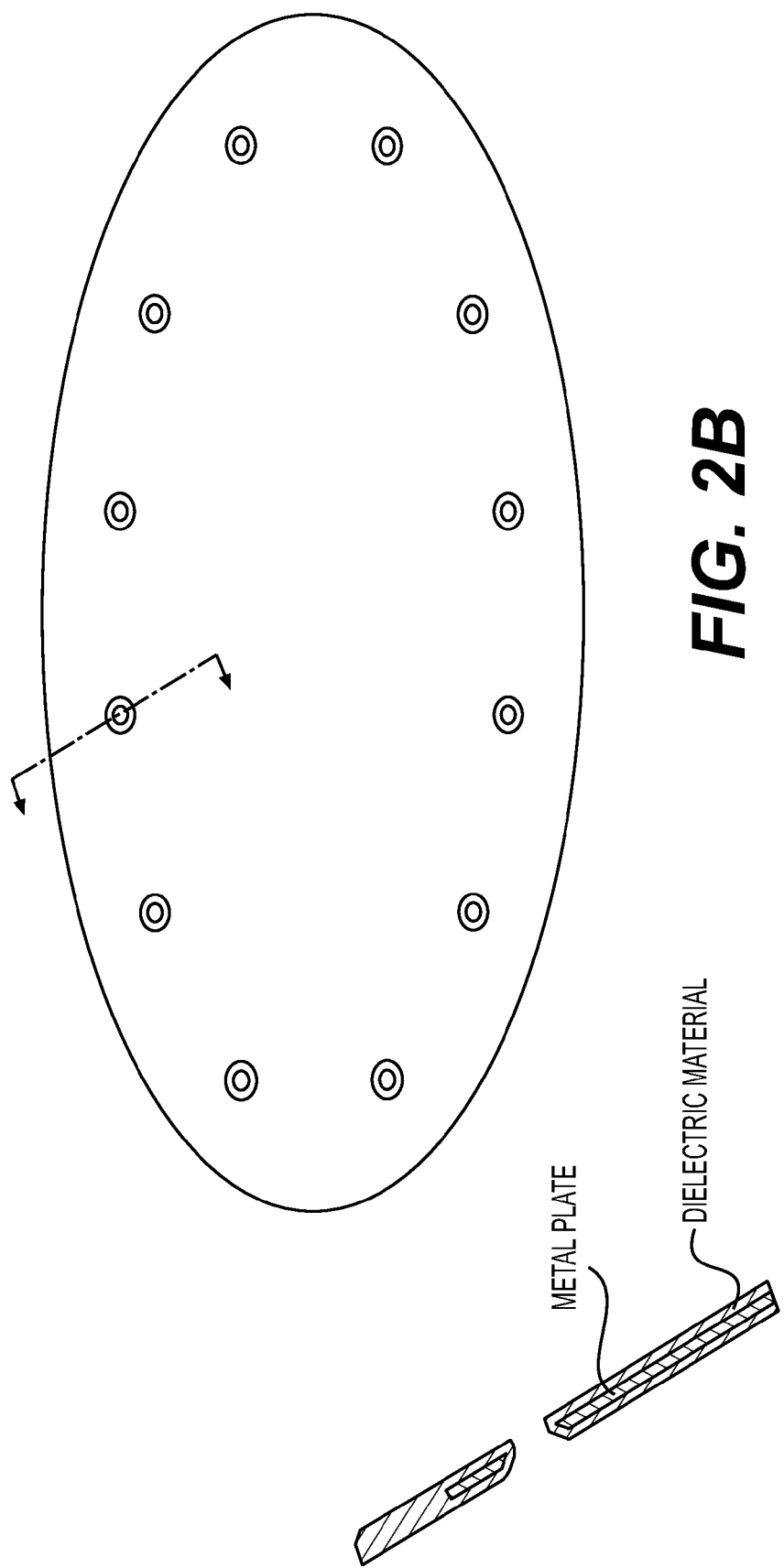

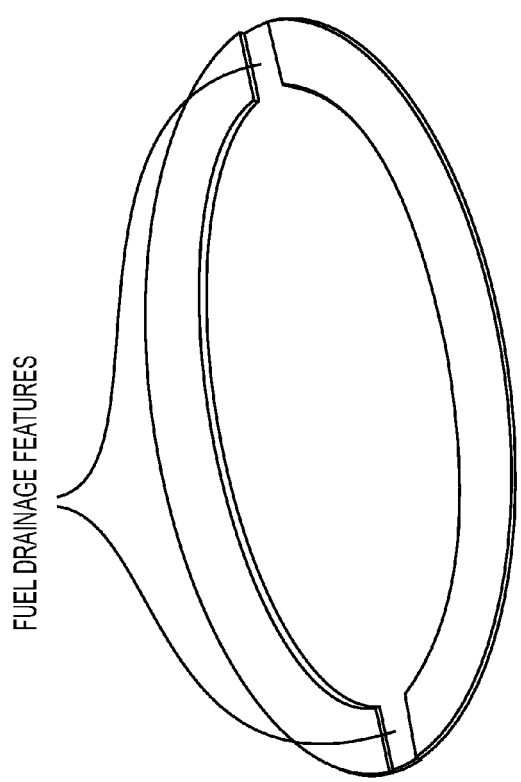
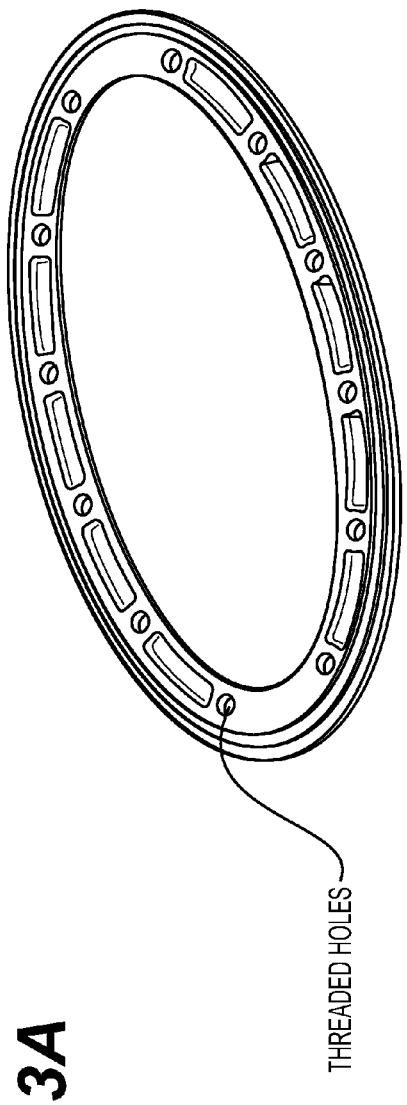
FUEL DRAINAGE FEATURES
FIG. 3A
THREADED HOLES
FIG. 3B

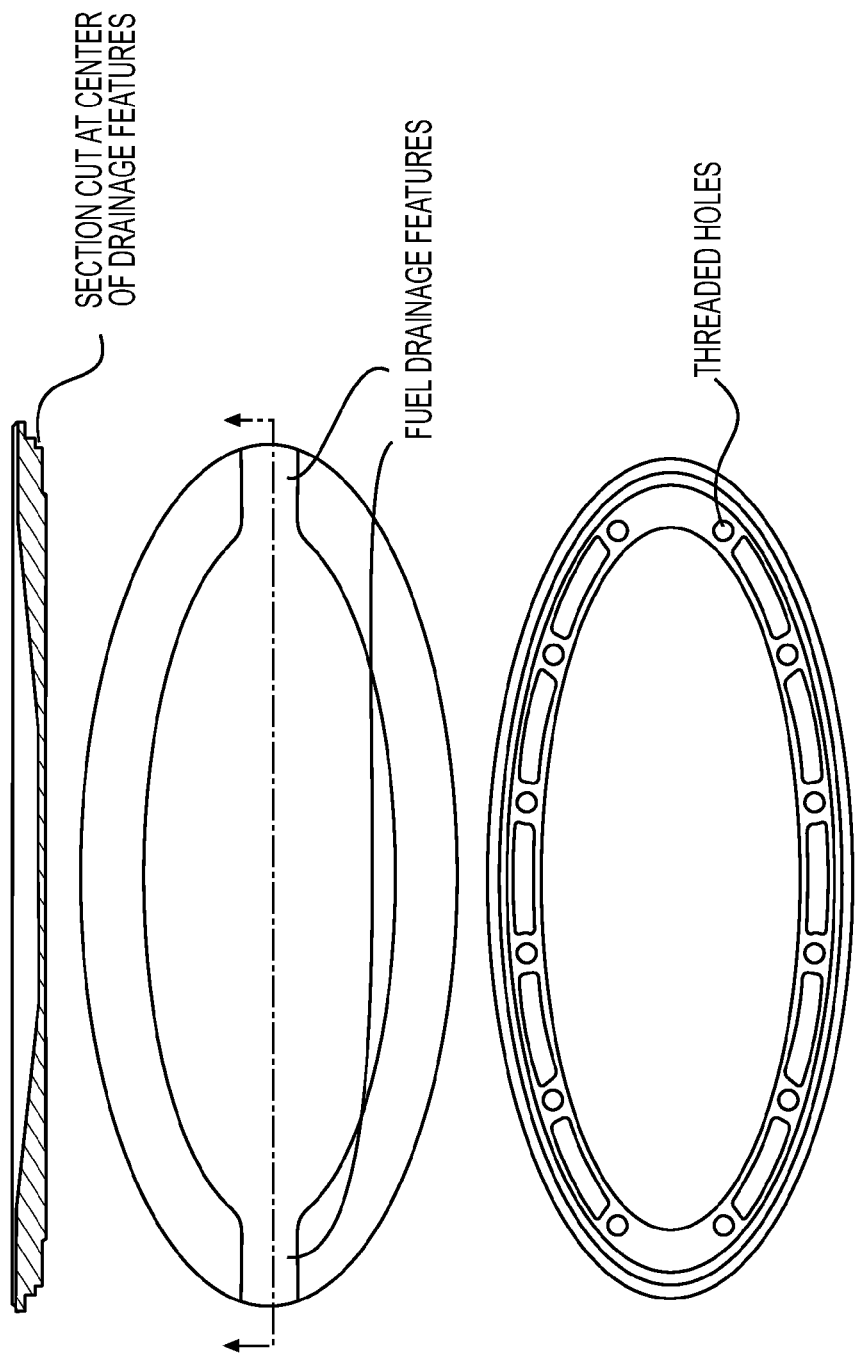

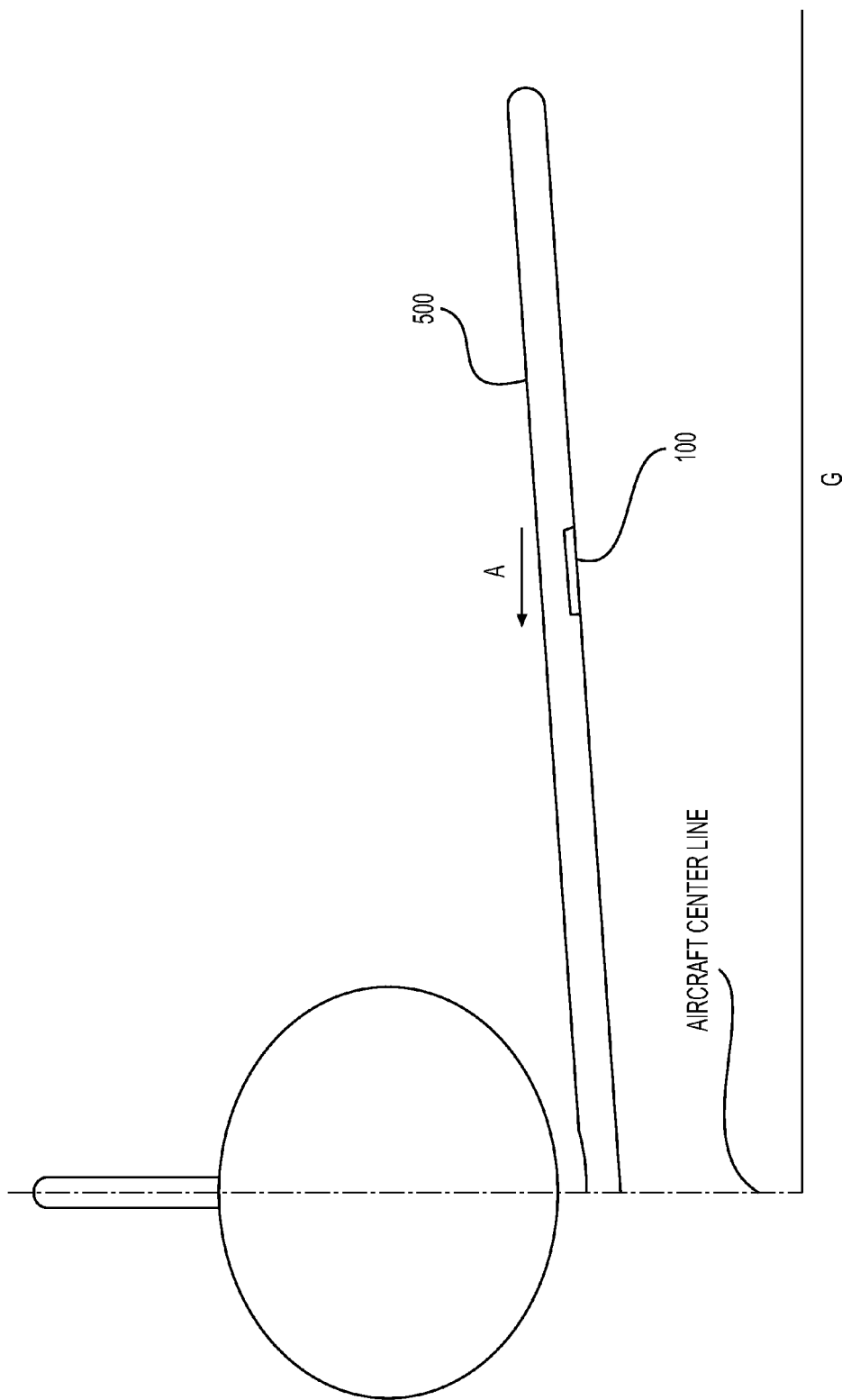

FUEL TANK ACCESS DOOR SYSTEMS AND METHODS

CROSS-REFERENCE TO RELATED APPLICATION

This application claims the benefit of priority from U.S. Provisional Patent Application No. 62/019,746, filed Jul. 1, 2014, which is hereby incorporated by reference in its entirety.

BACKGROUND OF THE INVENTION

1. Field of the Invention

The invention relates generally to the field of aircraft fuel tank access doors. More specifically, the present invention relates to fuel tank access doors having features that protect against lightning, precipitation static, and corrosion.

2. Description of the Related Art

Aircraft wings are equipped on their undersides with fuel tank access doors that allow for inspection of fuel tanks located within the wings. Generally, each access door includes an inner door located inside the wing and an outer door located outside the wing. The inner and outer doors may be secured to the wing by clamping a portion of the aircraft skin between the doors, and fastening the doors directly to one another.

Typically, the outer fuel tank access door is made of aluminum to meet Federal Aviation Administration (FAA) fuel pooling fire requirements, and lightning protection is provided by purposeful arcing between the outer fuel tank access door and the aircraft skin. This arcing is accomplished by use of a high impedance gasket between the door surface and the aircraft skin land area. In order to also protect against precipitation static ("p-static") the high impedance gasket is typically impregnated with carbon material and the land area is cleaned and painted with a p-static paint. This design works well for p-static; however, it results in galvanic action causing corrosion between the wing and access door surfaces.

A number of patents have disclosed components for providing lightning protection for an aircraft. For example, U.S. Pat. No. 4,291,816 discloses inner and outer door panels made of bendable material, where an electrically conductive surface, such as aluminum foil, may be adhered against the outer door panel to provide electrical conduction to the panel; U.S. Pat. No. 4,352,142 discloses a composite sandwich structure of aluminum and dielectric material applied to the surface of an aircraft structure to confine damage from a lightning strike to the sandwich layer which can be removed and replaced; U.S. Pat. No. 4,630,168 discloses a fastener having a metallic body and a dielectric cap covering a top portion of the fastener head, which allows the countersunk fastener to be painted along with the aircraft skin; and U.S. Pat. No. 7,050,286 discloses a structure for directing electrical dissipation from a lightning strike through the aircraft skin to prevent arcing at a fastener.

SUMMARY OF THE INVENTION

The present fuel tank access door systems and methods improve safety by minimizing the risk of lightning attachment, p-static build up and fuel pooling at the access door. These benefits are achieved in some systems and methods, for example, by completely encapsulating an outer metallic access door with a dielectric material and/or providing the inner fuel tank access door with at least one drainage feature.

The disclosed systems and methods also decrease maintenance costs and simplify installation by eliminating the need for p-static paint, which allows the aircraft skin to retain its corrosion preventative primer.

In addition, inner fuel tank access doors of the present system have form factors or geometries that eliminate a cavity between the inner and outer fuel tank access doors. This cavity, found in most existing systems, is intended to reduce weight, but it is capable of trapping moisture and encouraging corrosion on the outer fuel tank access door. In the present systems, the inner fuel tank access door weight is reduced by dishing out the top side of the inner fuel tank access door and providing at least one drainage feature. By sloping the drainage path substantially along the longitudinal axis of the wing, which is tilted toward the aircraft fuselage, fuel is prevented from being trapped on top of the inner access door as the fuel tank empties. This reduces or eliminates the fire hazard associated with fuel pooling.

In an embodiment, an aircraft fuel tank access door system comprises an outer fuel tank access door completely encapsulated by a dielectric material and an inner fuel tank access door comprising at least one drainage feature, where the inner fuel tank access door and the outer fuel tank access door are fastened directly or indirectly to one another.

In an embodiment, an aircraft fuel tank access door comprises an outer fuel tank access door completely encapsulated by a dielectric material.

In an embodiment, an aircraft fuel tank access door comprises an inner fuel tank access door comprising at least one drainage feature.

In an embodiment, an aircraft fuel tank access door at least meets the standards provided by DO-160G Section 23, Category 2A, which is expressly incorporated herein by reference. For example, specific dielectric strength, mechanical strength, etc. may be specified by DO-160G Section 23, Category 2A.

In an embodiment, a method of providing an aircraft with a fuel tank access door system comprises: providing an inner fuel tank access door comprising at least one drainage feature; orienting the inner fuel tank access door such that the at least one drainage feature is aligned substantially along the longitudinal axis of the aircraft wing; providing an outer fuel tank access door completely encapsulated by a dielectric material; and fastening the outer fuel tank access door to the inner fuel tank access door.

In an embodiment, a method of providing an aircraft with a fuel tank access door system comprises: providing an inner fuel tank access door comprising at least one drainage feature; orienting the inner fuel tank access door such that the at least one drainage feature is aligned substantially along the longitudinal axis of the aircraft wing; providing an outer fuel tank access door; and fastening the outer fuel tank access door to the inner fuel tank access door.

In an embodiment, a method of providing an aircraft with a fuel tank access door system comprises: providing an inner fuel tank access door; providing an outer fuel tank access door completely encapsulated by a dielectric material; and fastening the outer fuel tank access door to the inner fuel tank access door.

BRIEF DESCRIPTION OF THE DRAWINGS

FIG. 2B shows a cross-sectional view of the holes of the outer fuel tank access doors of FIG. 1A, FIG. 1B and FIG. 2A in greater detail.

FIG. 3A and FIG. 3B show top and bottom perspective views, respectively, of an exemplary inner fuel tank access door, according to an embodiment.

FIG. 4A shows a cross sectional view of a drainage feature (top) and greater detail of the inner fuel tank access doors of FIG. 3A and FIG. 3B (middle and bottom).

FIG. 5 shows an inner fuel tank access door having at least one drainage feature aligned substantially along a longitudinal axis of an aircraft wing, according to an embodiment.

DETAILED DESCRIPTION

Figure 1A:
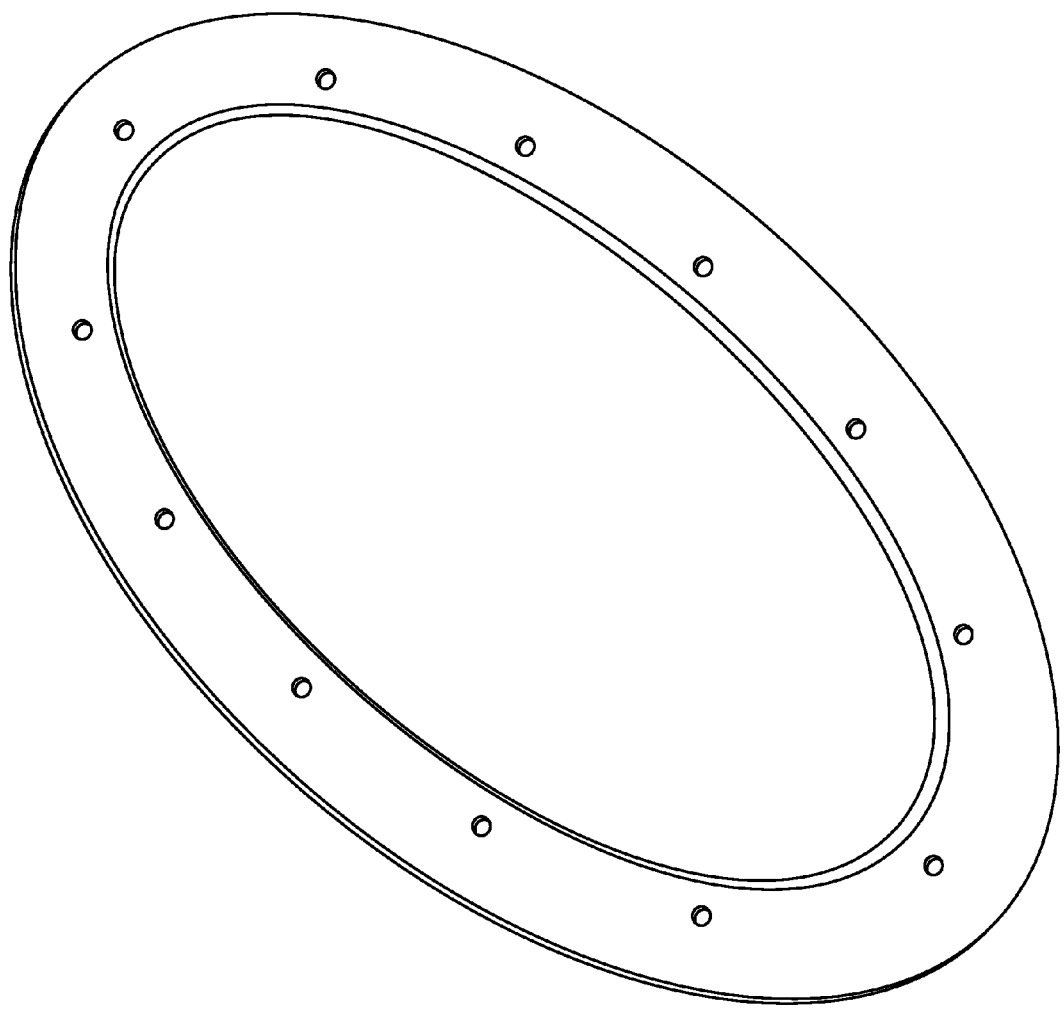
FIG. 1A and FIG. 1B show top and bottom perspective views, respectively, of an exemplary outer fuel tank access door, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, "top" and "bottom" surfaces of fuel tank access doors are described relative to the upright aircraft orientation. Thus, the top surface of the inner fuel tank door, which faces the inside of a fuel tank, forms the top of the fuel tank access door stack and the bottom surface of the outer fuel tank door, which faces outside the aircraft, forms the bottom of the fuel tank access door stack.

A "system" is a combination of components operably connected to produce one or more desired functions. A "component" is used broadly to refer to an individual part of a system.

"Encapsulated" refers to the orientation of one structure such that it is at least partially, and in some cases completely, surrounded by one or more other structures, such as an encapsulating layer. "Partially encapsulated" refers to the orientation of one structure such that it is partially surrounded by one or more other structures, for example, wherein 30%, or optionally 50% or optionally 90%, of the external surfaces of the structure are surrounded by one or more other structures. "Completely encapsulated" refers to the orientation of one structure such that it is completely surrounded by one or more other structures.

"Dielectric" refers to a non-conducting or insulating material. Specific examples of dielectric materials include, but are not limited to, silicon nitride, silicon dioxide, fiberglass and plastics.

"Plastic" or "plastic material" refers to a polymer material comprising macromolecules composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications.

"Alignment" is used herein to refer to the relative arrangement or position of surfaces, objects or components.

"Contiguous" refers to materials or layers that are touching or connected throughout in an unbroken sequence. A contiguous object may be a monolithic object.

"Unitary" refers to an object formed as a single piece or undivided whole.

The terms "direct" and "indirect" describe the actions or physical positions of one component relative to another component, or one layer relative to another layer. For example, a component or layer that "directly" acts upon or touches another component does so without intervention from an intermediary. Contrarily, a component or layer that "indirectly" acts upon or touches another component does so through an intermediary (e.g., a third component or layer).

Fuel tank access door systems and associated methods will now be described with reference to the figures, which are not drawn to scale. Fuel tank access doors are typically selected from four sizes ranging in diameter between 11 inches and 18 inches, although those of skill in the art will recognize that larger or smaller fuel tank access doors may be prepared.

Figure 1B:
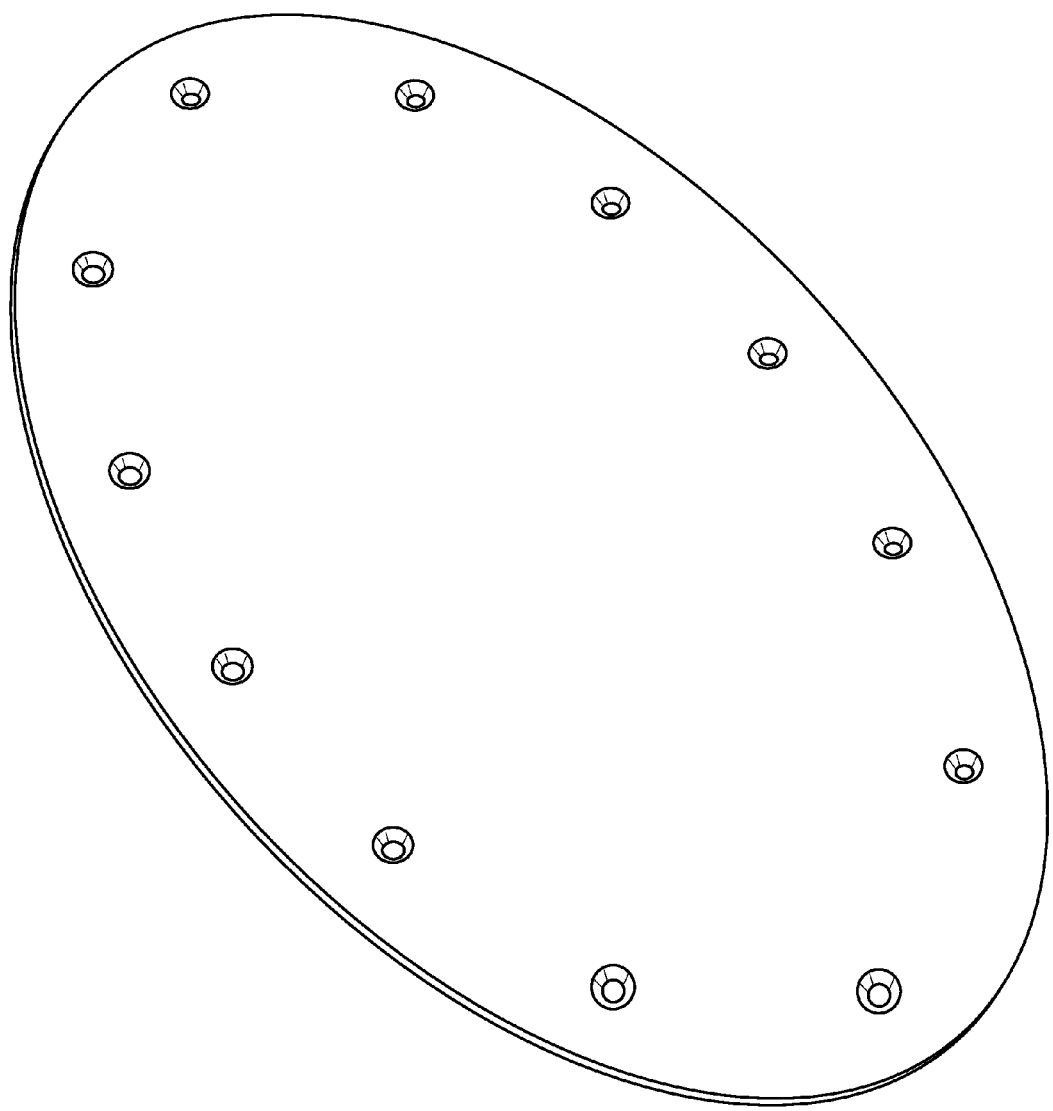

FIG. 1A and FIG. 1B show top and bottom perspective views, respectively, of an exemplary outer fuel tank access door, according to an embodiment. Fuel tank access door systems disclosed herein utilize a metal plate (required for fuel pooling fire requirements) encapsulated within a dielectric material that prevents lightning and p-static build-up, thereby eliminating the need for p-static paint and conductive gaskets. It is not possible to simply use composite skins for this application, due to the fuel pooling fire requirement. The door must be made of, or be as good as, aluminum; by using a dielectric material to encapsulate a metal plate, the lightning/p-static advantages of the dielectric material and the fuel resistant properties of the metal are both realized.

Figure 2A:
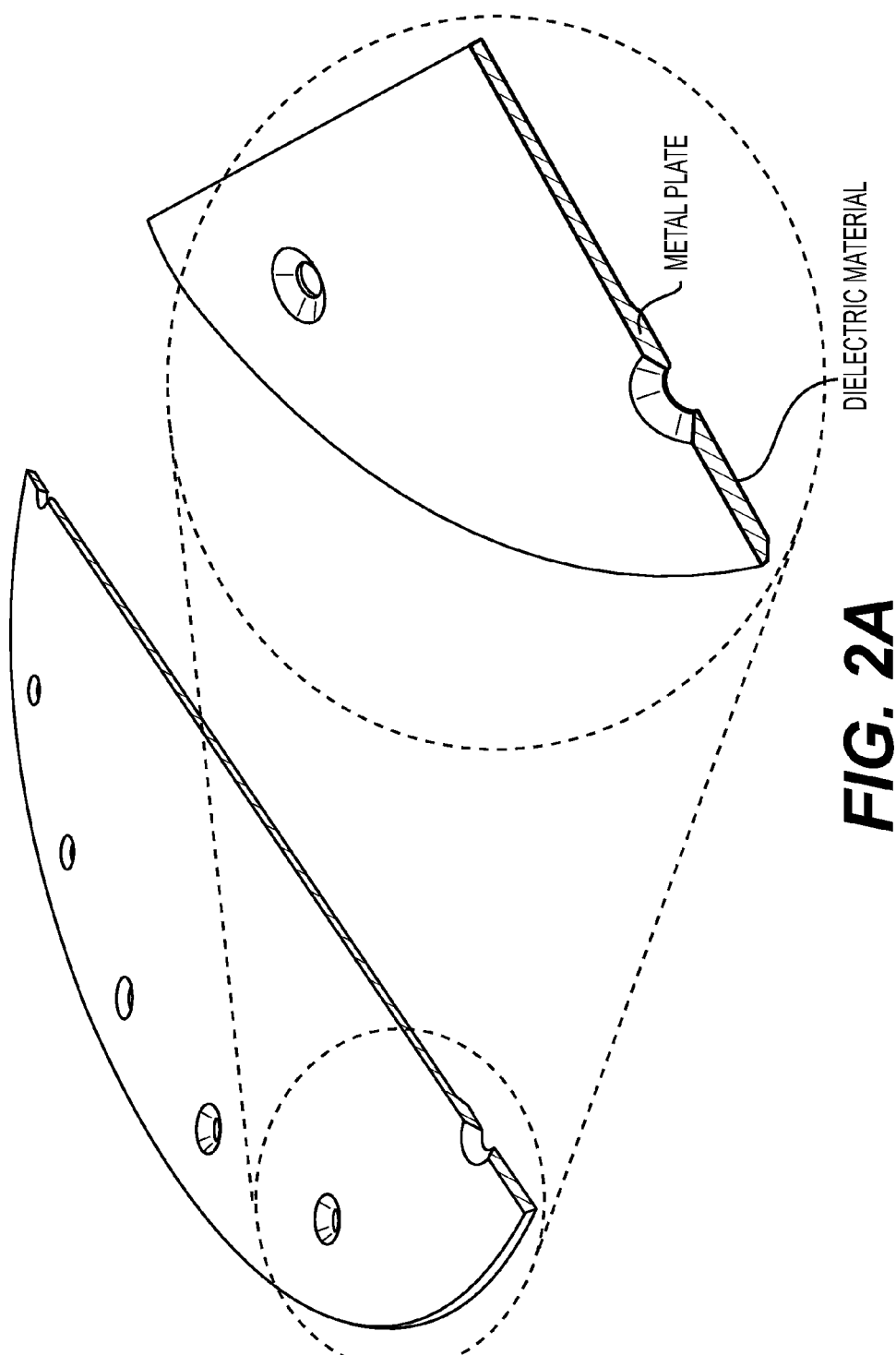
FIG. 2A is a cross-sectional and exploded view of the outer fuel tank access door of FIG. 1 showing a metal plate completely encapsulated by a dielectric material, according to an embodiment.

In the embodiment shown in FIG. 1, the outer fuel tank access door comprises a rim of thicker material around a circumference of the top surface of the door and a plurality of holes disposed around the rim for receiving fasteners. FIG. 2A is a cross-sectional and exploded view of the outer fuel tank access door of FIG. 1 showing a metal plate completely encapsulated by a dielectric material, according to an embodiment. FIG. 2B shows a cross-sectional view of the holes of the outer fuel tank access doors of FIG. 1A, FIG. 1B and FIG. 2A in greater detail. It can be seen, for example, that the dielectric material coats the inside of each of the holes in the rim of the outer door.

In an embodiment, the outer fuel tank access door comprises aluminum, stainless steel, titanium, or alloys thereof encapsulated by the dielectric material. In an embodiment, the outer fuel tank access door comprises a metal or alloy having a melting point of 950° F. or higher. The dielectric material may, for example, be selected from the group consisting of silicon nitride, silicon dioxide, fiberglass, plastic and combinations thereof. The dielectric material typically forms an encapsulation layer having a thickness selected from a range of 0.25 µm to 10 mm, or 0.1 µm to 5 mm, or 1 µm to 2 mm. In an embodiment, a dielectric material forms an encapsulation layer having a thickness of at least 0.25 µm.

FIG. 3A and FIG. 3B show top and bottom perspective views, respectively, of an exemplary inner fuel tank access door, according to an embodiment. The inner fuel tank access door may, for example, be a monolithic component made of dielectric material, selected from the group consisting of nylon, fiberglass or other plastics. In the embodiment shown, the top surface of the inner door (FIG. 3A) comprises two drainage features. For example, the inner fuel tank access door may comprise a raised lip with drainage features configured as channels extending radially through the raised lip. In an embodiment, the channel has a minimum width selected from the range of 1 cm to 6 cm and a length selected from the range of 2 cm to 10 cm.

The top figure of FIG. 4A shows a cross-sectional view of a drainage feature that is taken perpendicular to the dashed line shown in the middle figure of FIG. 4A, as well as greater detail of the inner fuel tank access doors of FIG. 3A and FIG. 3B (middle and bottom). As shown in FIG. 4A the surfaces of the drainage feature are smooth and tapered to prevent liquid adhesion, in an embodiment.

Figure 4B:
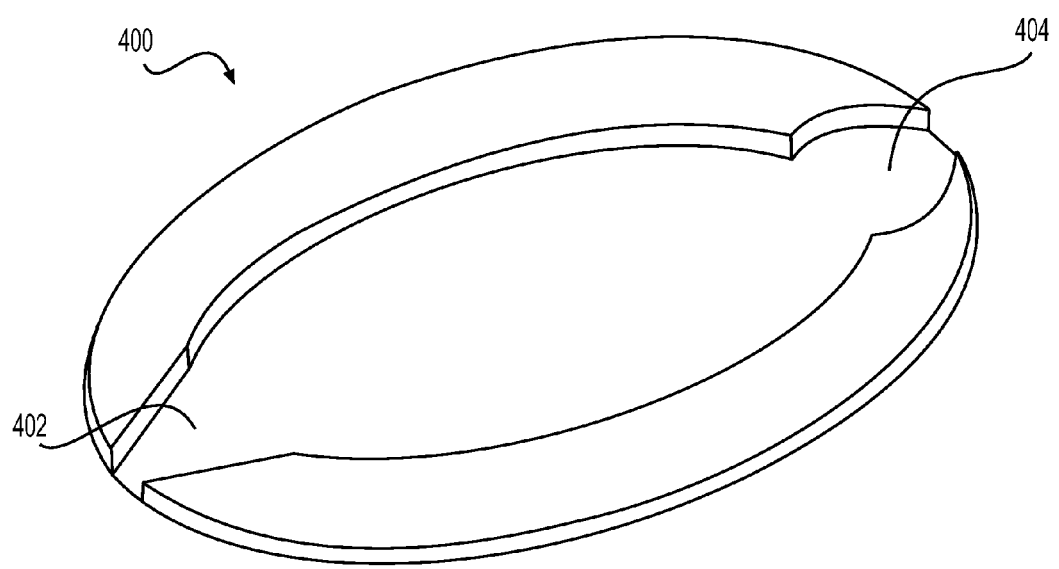
FIG. 4B shows a perspective view of a top surface of an inner fuel tank access door comprising additional exemplary drainage features, according to multiple embodiments.

FIG. 4B shows a perspective view of a top surface of an inner fuel tank access door 400 comprising exemplary drainage features 402, 404, according to multiple embodiments. Drainage feature 402 is a tapered channel having a wider opening near a center portion of inner fuel tank access door 400 and a narrower opening near the outer perimeter of inner fuel tank access door 400 to help direct fuel on the surface toward the perimeter. Likewise, drainage feature 404 is tapered to direct fuel away from a center portion of inner fuel tank access door 400 and toward its perimeter. The channel of drainage feature 404 is formed by curved walls.

FIG. 5 shows a fuel tank access door system 100 having at least one drainage feature aligned along the direction of arrow A and substantially along a longitudinal axis of an aircraft wing 500, according to an embodiment. Aligning a drainage feature substantially along the longitudinal axis of the wing provides gravity assistance for removing fuel from the top surface of the inner fuel tank access door.

The bottom surface of the inner fuel tank access door, shown in FIG. 3B, comprises a raised central portion that mates with the central portion on the top surface of the outer door to prevent a cavity from forming between the doors. The bottom surface also includes a plurality of threaded holes disposed around a circumference of the inner fuel tank access door for aligning with the holes of the outer fuel tank access door and receiving fasteners.

Figure 6:
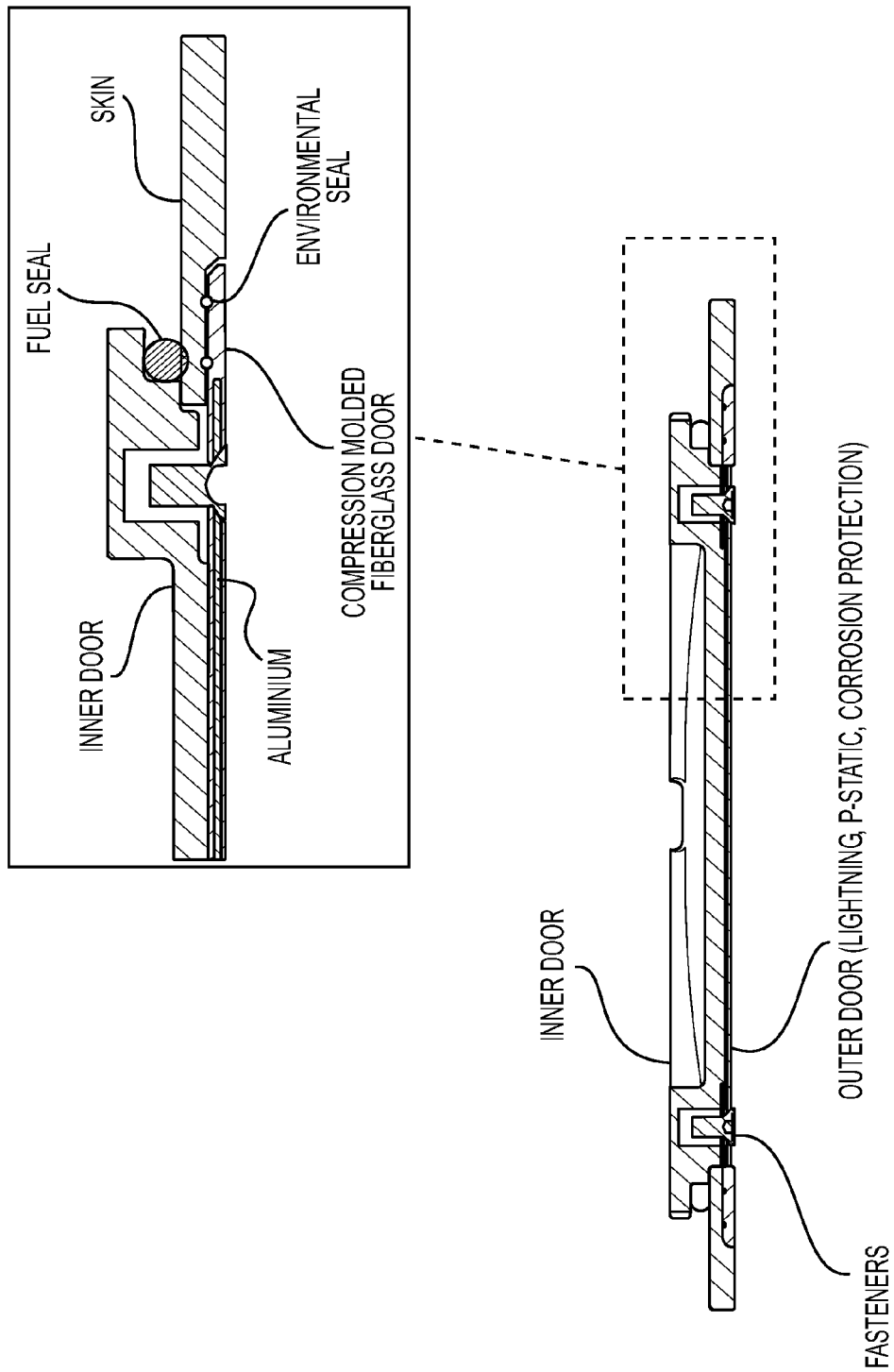
FIG. 6 shows the outer fuel tank access door of FIG. 1 and the inner fuel tank access door of FIG. 3 joined together by fasteners and clamped to the skin of an aircraft wing, according to an embodiment.

FIG. 6 shows the outer fuel tank access door of FIG. 1 and the inner fuel tank access door of FIG. 3 joined together by fasteners and clamped to the skin of an aircraft wing, according to an embodiment. Sealants may be applied between the aircraft skin and the fuel tank access doors to prevent the ingress or egress of fluids, such as fuel, fuel vapors, water and other atmospheric gases, or environmental irritants, such as sand, ice and the like.

According to some embodiments, a method of providing an aircraft with a fuel tank access door system comprises: providing an inner fuel tank access door comprising at least one drainage feature; orienting the inner fuel tank access door such that the at least one drainage feature is aligned substantially along a longitudinal axis of the aircraft wing; providing an outer fuel tank access door completely encapsulated by a dielectric material; and fastening the outer fuel tank access door to the inner fuel tank access door.

In an embodiment, a method of providing an aircraft with a fuel tank access door system comprises: providing an inner fuel tank access door comprising at least one drainage feature; orienting the inner fuel tank access door such that the at least one drainage feature is aligned substantially along a longitudinal axis of the aircraft wing; providing an outer fuel tank access door; and fastening the outer fuel tank access door to the inner fuel tank access door.

In an embodiment, a method of providing an aircraft with a fuel tank access door system comprises: providing an inner fuel tank access door; providing an outer fuel tank access door completely encapsulated by a dielectric material; and fastening the outer fuel tank access door to the inner fuel tank access door.

In some embodiments, the outer fuel tank access door is secured directly to the inner fuel tank access door, with only a clamping action securing the doors to the aircraft skin. For example, the outer fuel tank access door may be secured directly to the inner fuel tank access door with at least one screw mounted in a fiberglass insert. In an alternate embodiment, the outer fuel tank access door may be secured indirectly to the inner fuel tank access door. For example, the outer fuel tank access door may be secured indirectly to the inner fuel tank access door with at least one screw mounted in a fiberglass insert.

In some embodiments, the system does not include a high impedance gasket or provide a purposeful arcing path. Thus, in some embodiments, the outer fuel tank access door may be in direct contact with a corrosion preventative primer on the aircraft skin.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the systems, system components, and method steps set forth in the present description. As will be apparent to one of skill in the art, methods and systems useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a door" includes a plurality of such doors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

The invention claimed is:

1. An aircraft fuel tank access door system comprising: an outer fuel tank access door completely encapsulated by a dielectric material; and an inner fuel tank access door comprising at least one drainage feature, wherein the inner fuel tank access door comprises a raised lip with the at least one drainage feature configured as a channel extending radially through the raised lip and the inner fuel tank access door and the outer fuel tank access door are fastened directly to one another.

2. The system of claim 1, wherein the outer fuel tank access door comprises aluminum, stainless steel, titanium or alloys thereof encapsulated by the dielectric material.

3. The system of claim 1, wherein the dielectric material is selected from the group consisting of silicon nitride, silicon dioxide, fiberglass and plastic.

4. The system of claim 1, wherein the dielectric material forms an encapsulation layer having a thickness selected from a range of 0.25 tm to 2 mm.

5. The system of claim 1, wherein the dielectric material forms an encapsulation layer having a thickness of at least 0.25 μm.

6. The system of claim 1, wherein the inner fuel tank access door is a monolithic plastic component.

7. The system of claim 1, wherein the inner fuel tank access door comprises at least two drainage features.

8. The system of claim 1, wherein the at least one drainage feature is tapered.

9. The system of claim 1, wherein the channel has a minimum width selected from the range of 1 cm to 6 cm.

10. The system of claim 1, wherein the channel has a length selected from the range of 2 cm to 10 cm.

11. The system of claim 1, wherein the outer fuel tank access door is secured to the inner fuel tank access door with at least one screw mounted in a fiberglass insert.

12. The system of claim 1, wherein the system does not comprise a high impedance gasket.

13. The system of claim 1, wherein the system does not provide a purposeful arcing path.

14. The system of claim 1, wherein the outer fuel tank access door is in direct contact with a corrosion preventative primer on the aircraft skin.

15. A method of providing an aircraft with a fuel tank access door system, the method comprising: providing an inner fuel tank access door comprising at least one drainage feature, wherein the inner fuel tank access door comprises a raised lip with the at least one drainage feature configured as a channel extending radially through the raised lip; orienting the inner fuel tank access door such that the at least one drainage feature is aligned substantially along a longitudinal axis of the aircraft wing; providing an outer fuel tank access door completely encapsulated by a dielectric material; and fastening the outer fuel tank access door to the inner fuel tank access door.

16. The method of claim 15, wherein the outer fuel tank access door comprises aluminum, stainless steel, titanium or alloys thereof encapsulated by the dielectric material.

17. The method of claim 15, wherein the dielectric material forms an encapsulation layer having a thickness of at least 0.25 μm.

18. The method of claim 15, wherein the step of providing the outer fuel tank access door comprises placing the outer fuel tank access door in direct contact with a corrosion preventative primer on the aircraft skin.

19. An aircraft fuel tank access door system comprising: an outer fuel tank access door substantially encapsulated by a dielectric material; and an inner fuel tank access door comprising at least one tapered drainage channel, wherein the inner fuel tank access door and the outer fuel tank access door are fastened directly to one another.

20. The system of claim 19, wherein the at least one tapered drainage channel is aligned substantially along a longitudinal axis of the aircraft wing.

* * * * *